Figure 1:
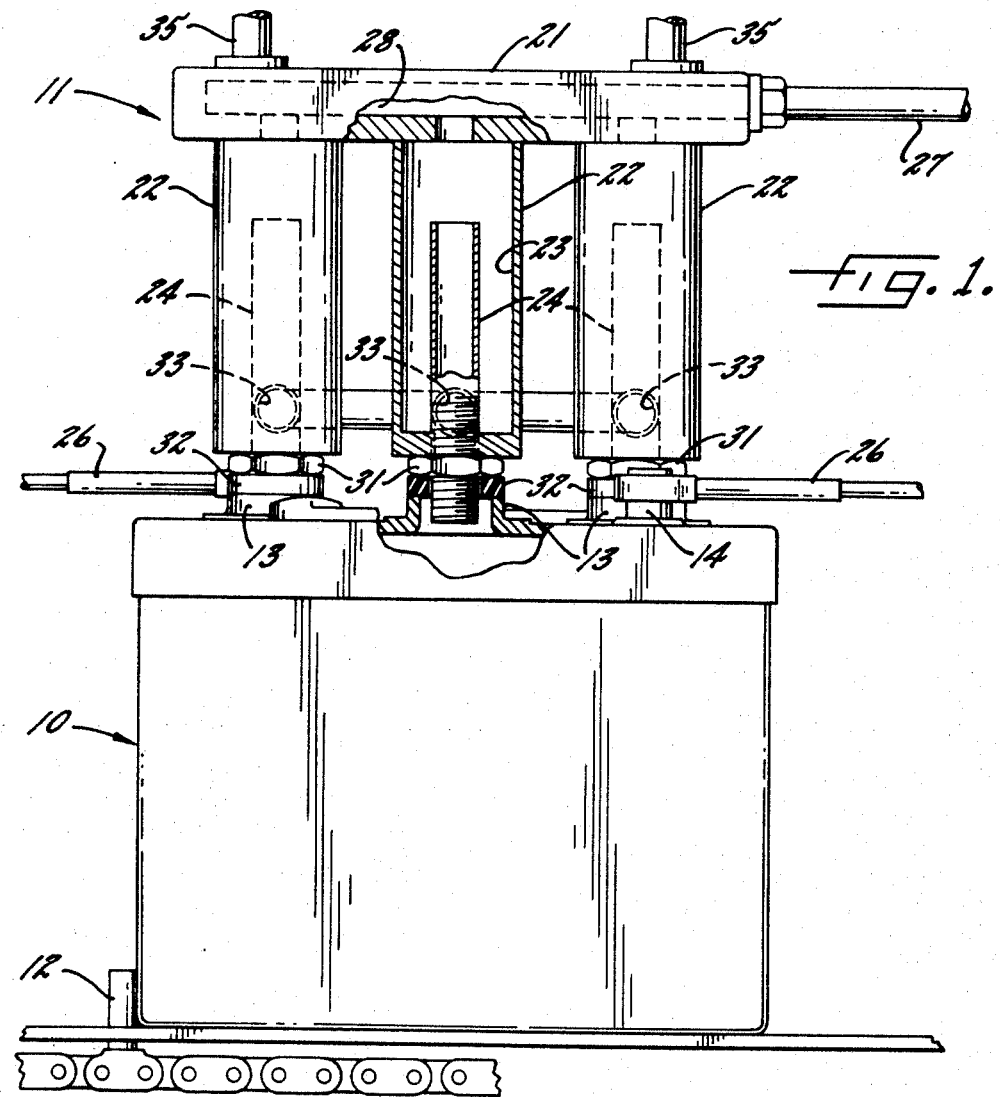

United States Patent [19]

Oswald

[11] 3,753,785
[45] Aug. 21, 1973

[54] ACID MIXING METHOD

[75] Inventor: Thomas L. Oswald, St. Paul, Minn.

[73] Assignee: Gould Inc., Mendota Heights, Minn.

[22] Filed: Mar. 29, 1972

[21] Appl. No.: 239,203

[52] U.S. Cl. .................................. 136/161, 136/176
[51] Int. Cl. .......................................... H01m 45/00
[58] Field of Search..................... 136/161, 34, 176, 136/162, 67, 160, 165

[56] References Cited
UNITED STATES PATENTS

| | | | |
|---|---|---|---|
| 2,274,118 | 2/1942 | Altmayer | 136/162 |
| 2,637,836 | 5/1953 | Kendall et al. | 136/165 |
| 2,732,985 | 1/1956 | Howard | 136/162 |
| 3,249,132 | 5/1966 | Eberle | 136/162 |

Primary Examiner—Donald L. Walton
Attorney—C. Frederick Leydig, Phillip H. Mayer et al.

[57] ABSTRACT

A method for adjusting upward the acid concentration of the electrolyte in a lead-acid battery "formed" by charging with electrolyte at low acid concentration, in which high concentration acid electrolyte is added to the battery, the battery is charged for a short time interval at high current to produce violent gassing and thus drive a substantial portion of the electrolyte out of the battery, vacuum is applied to draw off the gas, and the then-mixed electrolyte is allowed to flow back into the battery.

5 Claims, 2 Drawing Figures

PATENTED AUG 21 1973 3,753,785

ACID MIXING METHOD

This invention relates generally to the manufacture of lead acid electrical storage batteries and more particularly concerns providing such batteries with a proper concentration of acid electrolyte.

"Formation", one of the final procedures in the manufacture of lead acid batteries of the wet type as opposed to those which are dry charged, consists of giving the battery an initial charge while the battery contains electrolyte at a low acid concentration level. After formation, the electrolyte is replaced with more concentrated acid to bring the electrolyte concentration level to that best suited for normal operation of the battery.

Presently known practice, even for high production rates, consists of initially filling the battery cells with low concentration electrolyte such as sulphuric acid at about 1.100 specific gravity, charging the battery through a formation cycle, inverting the battery to empty all of the free-flowing electrolyte, adding electrolyte at a high concentration, and giving the battery a low "mixing" charge, on the order of 4 amps or lower, for a number of hours, from 4 to 20 hours being typical. The mixing charge step is necessary because significant amounts of the original low concentration electrolyte are not free-flowing, being retained because of the shape of the container and in the structure of the plates and separators of the battery, and hence will not simply pour out. By adding high concentration electrolyte, acid having a specific gravity on the order of 1,320, and allowing time and the gassing caused by the low charge rate to mix the acids of different concentration, a proper ultimate and uniform acid concentration level, of about 1.260 specific gravity, is obtained for the electrolyte. The battery is then ready for shipment.

It is the primary aim of the invention to provide an acid mixing method for storage batteries which greatly reduces the times required — permitting the accomplishment in less than 30 seconds of what has taken many hours under present practice.

A further object of the invention is to provide a method as referred to above that is well suited for performance as a production line, high volume, production step.

Another object is to provide a method of the foregoing character which is economical to practice in that less power is required and no storage space or storage equipment is needed.

Figure 2:
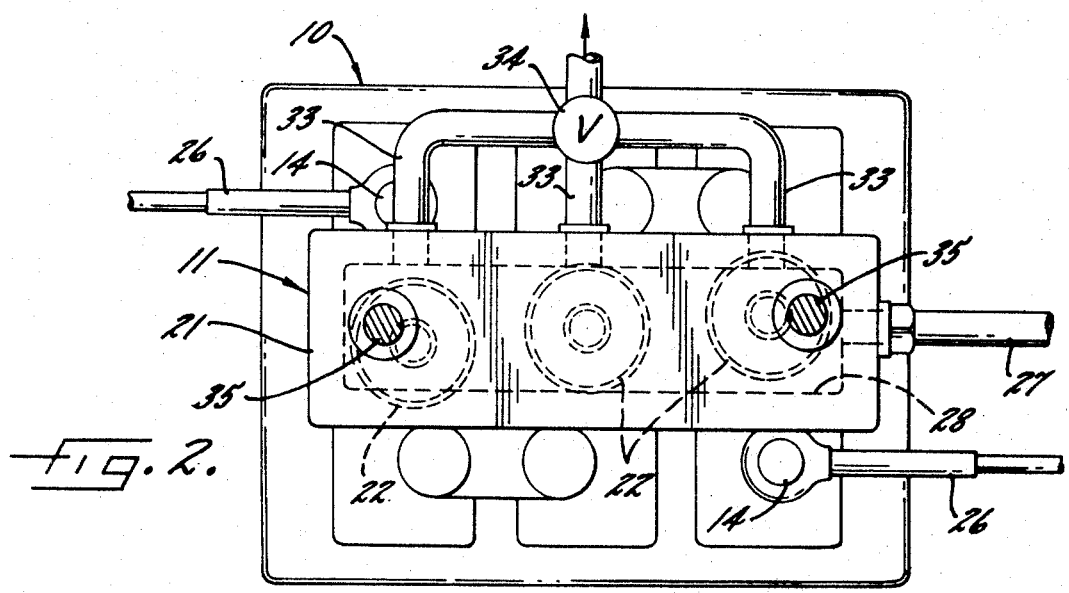
Figure 1:
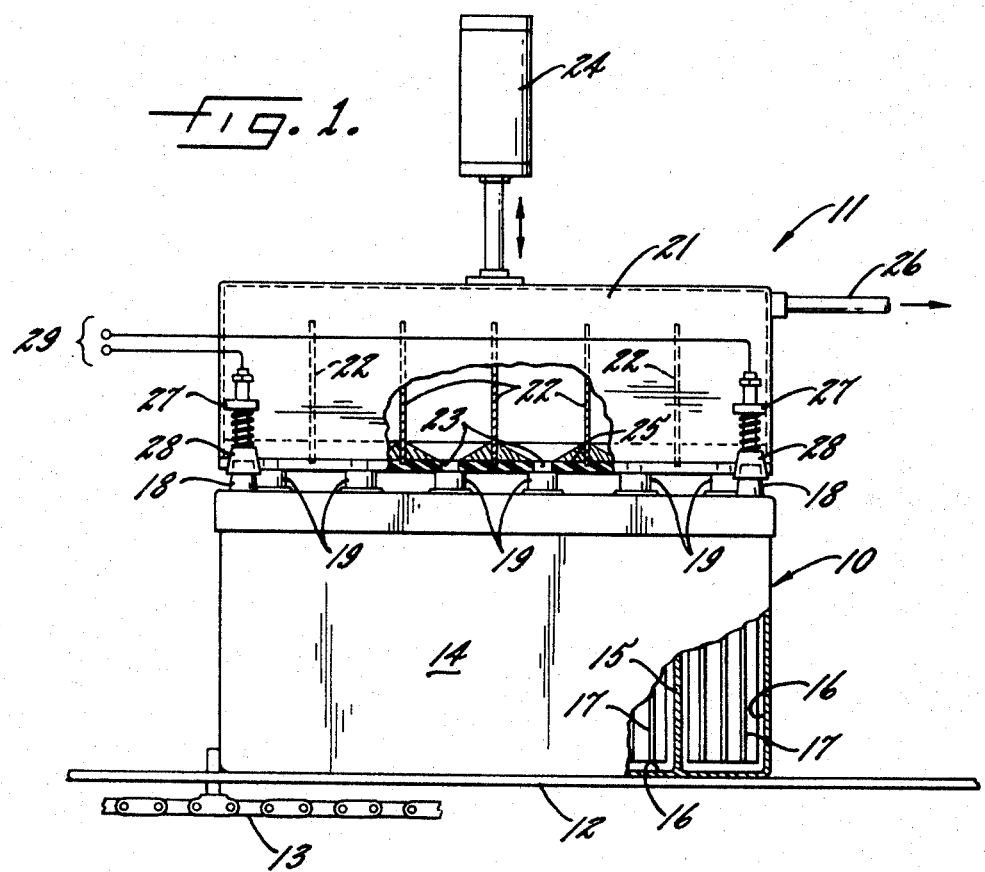
Figure 2:
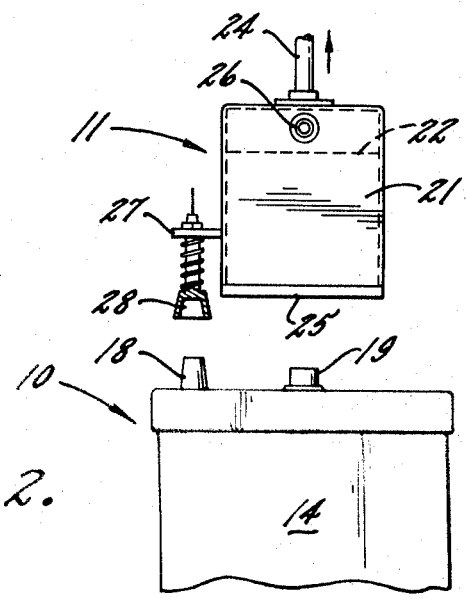

Other objects and advantages of the invention will become apparent upon reading the following detailed description and upon reference to the drawings, in which:

FIG. 1 is a schematic elevation of a portion of apparatus intended to perform the method of the invention; and FIG. 2 is an end elevation of the schematic structure shown in FIG. 1 with the parts in an alternate position.

While the invention will be described in connection with a preferred procedure, it will be understood that I do not intend to limit the invention to that procedure. On the contrary, I intend to cover all alternatives, modifications and equivalents as may be included within the spirit and scope of the invention as defined by the appended claims.

Turning to the drawing, there is shown a battery 10 at a mixing station 11 on a platform 12 of an assembly machine which also includes a conveyor 13 for moving batteries to and from the station. The battery 10, a lead acid battery in the illustrated embodiment, includes a container 14 having partitions 15 dividing the container into cells 16, each of which contains a plate and separator structure 17. Terminal posts 18 and vent collars 19 opening into the respective cells 16 are provided on the top of the battery 10.

The mixing station 11 is established at that point of the battery manufacturing process following formation and subsequent replacement of the low acid concentration formation electrolyte with high acid concentration electrolyte. Formation involves adding to the newly assembled battery electrolyte at a relatively low concentration, for example, sulphuric acid having approximately 1.100 specific gravity, and charging the battery. Thereafter, the free-flowing electrolyte is removed, preferably by inverting the battery so as to pour out the electrolyte. This leaves a substantial volume of formation electrolyte retained because of the internal configuration of the container 14 and in the porous plate and separator structures 17. To bring the electrolyte acid concentration up to normal battery operating level, which in the case of sulphuric acid is on the order of 1.260 specific gravity, the battery cells are filled with electrolyte at a higher concentration, approximately 1.320 specific gravity, which when mixed with the retained formation electrolyte, will adjust the acid concentration level to the desired value.

In accordance with the invention, the acid in the battery 10 is quickly and economically mixed by charging the battery for a short time interval at a high current rate so as to cause violent gassing to drive a substantial volume of the electrolyte out of the battery including non-free-flowing low concentration electrolyte retained in the internal battery components 17, and thereafter allowing the then-mixed electrolyte to flow back into the battery. Preferably, vacuum is applied to the electrolyte driven from the battery so as to facilitate removal of gas from the electrolyte and the battery prior to allowing the mixed electrolyte to flow back into the cells. Also, to insure uniform filling of the respective cells 16, the electrolyte driven from each cell is held separately and allowed to drain back into only the cell from which it was driven.

A simple device to facilitate the performance of these steps includes a box-like structure 21 divided by partitions 22 into a plurality of chambers each having a sloping bottom leading to an opening 23 overlying one of the vent collars 19 of the battery 10 at the station 11. The structure 21 is adapted to be moved vertically toward and away from the battery 10 by an actuator 24, and a resilient bottom surface 25 surrounding the openings 23 insures a fluid-tight passage between the battery cells 16 and a respective one of the chambers through the vent collars 19 and the chamber openings 23. A line 26 opening into the upper portion of the structure 21 connects the chamber to a source of vacuum, i.e., a pump or other apparatus for selectively reducing the air pressure in the chambers.

For conveniently establishing a charging circuit, the structure 21 has lugs 27 carrying connectors 28 spring-biased downwardly so as to firmly engage the terminals 18, with some upward lost motion, upon downward movement of the structure 21 to press the surface 25 against the vent collars 19. Lines 29 couple the connectors 28 to a source of d-c. current.

In operation, the battery 10 goes through a formation cycle, is inverted to dump or spill out the free-flowing formation electrolyte and is moved on the platform 12 by the conveyor 13 to the station 11. The actuator 24 brings the structure 21 down so that the resilient surface 25 is pressed against the vent collars 19 establishing fluid-tight communication between the cells 16 and the individual chambers in the structure 21 defined by the partitions 22. At the same time, the connectors 28 are brought into electrical engagement with the battery terminals 18. A high charging current is then applied to the lines 29, on the order of 0.5 to 2.0 amperes per square inch of positive plate surface, for a short time interval, on the order of five to twenty seconds. This high current causes violent gassing within the battery 10 that is effective to drive electrolyte in the cells 16 out of the battery and up into the overlying chambers. The electrolyte driven out includes the low concentration formation electrolyte previously retained within the porous structures 17. The line 26 applies a vacuum to the electrolyte within the chamber 21 thus quickly drawing off the gas from the battery and the electrolyte — this step requiring only a few seconds. The electrolyte is then allowed to drain back into the battery cells with each cell receiving, of course, only that electrolyte driven from that cell because of the separation of the structure 21 into individual chambers by the partitions 22.

The mechanical effects of the violent gassing driving all of the electrolyte out of the battery and up into the structure 21 effectively mixes the acids of different concentration with the result that the electrolyte acid concentration is adjusted to the desired battery operating level, within a time period which need not exceed 30 seconds.

Those familiar with this art will appreciate the distinct advantages of performing in less than 30 seconds what previously has taken many hours. It will also be apparent that the method can be performed quite readily under production line, high volume conditions. Less power is normally required in the performance of the described method as compared with previous long-term mixing charge cycles, and further economies are achieved by obviating the need for storage space or storage equipment to handle the batteries during such a cycle.

I claim as my invention:

1. In the manufacture of a battery which is formed by charging with electrolyte at low concentration, the method of adjusting the electrolyte concentration comprising the steps of removing free-flowing, low concentration electrolyte from the battery, filling the battery with high concentration electrolyte, charging the battery for a short time interval at a high current rate so as to cause violent gassing to drive a substantial portion of the electrolyte out of the battery including non-free-flowing low concentration electrolyte retained in the internal battery components, and allowing the then-mixed electrolyte driven from the battery to flow back into the battery.

2. The method of claim 1 including the step of applying a vacuum to the electrolyte driven from the battery so as to facilitate removal of gas from the battery and the electrolyte.

3. The method of claim 1 in which the battery includes a plurality of cells and the electrolyte driven from each cell is allowed to flow back into only that cell.

4. The method of claim 1 in which said current rate is on the order of 100 to 400 amperes and said short time interval is on the order of 5 to 20 seconds.

5. The method of claim 1 in which said internal battery components include plates and separators and said removing step is performed by inverting the battery to pour out the electrolyte not retained in said plates and separators.

* * * * *

UNITED STATES PATENT OFFICE
CERTIFICATE OF CORRECTION

Patent No. 3,753,785    Dated August 21, 1973

Inventor(s) Thomas L. Oswald

It is certified that error appears in the above-identified patent and that said Letters Patent are hereby corrected as shown below:

Sheet 1 of the drawings herein was inadvertently included from another patent application and should be, and is hereby, deleted. The abstract drawing, showing a figure from the deleted sheet, should also be considered deleted from the patent document.

Sheet 2 of the drawings is renumbered Sheet 1 and on the Cover Sheet under "Abstract", "2 Drawing Figures" is changed to read -- 1 Drawing Figure --.

Signed and sealed this 11th day of March 1975.

(SEAL)
Attest:

RUTH C. MASON
Attesting Officer

C. MARSHALL DANN
Commissioner of Patents
and Trademarks